US005086376A

United States Patent [19]

Blusseau

[11] Patent Number: 5,086,376
[45] Date of Patent: Feb. 4, 1992

[54] MOTOR VEHICLE HEADLIGHT HAVING A REFLECTOR OF COMPLEX SURFACE SHAPE WITH MODIFIED INTERMEDIATE ZONES

[75] Inventor: Eric Blusseau, Les Pavillons Sous Bois, France

[73] Assignee: Valeo Vision, Bobigny Cedex, France

[21] Appl. No.: 446,117

[22] Filed: Dec. 5, 1989

[30] Foreign Application Priority Data

Dec. 7, 1988 [FR] France ........................ 88 16061

[51] Int. Cl.[5] ........................ B60Q 1/04
[52] U.S. Cl. ........................ 362/61; 362/297; 362/305; 362/346; 362/347
[58] Field of Search ........................ 362/61, 80, 297, 304, 362/305, 346, 347, 348

[56] References Cited

U.S. PATENT DOCUMENTS 4,530,042 7/1985 Cibie et al. ........................ 362/61 X
4,704,661 11/1987 Kosmatka ........................ 362/346 X
4,772,988 9/1988 Brun ........................ 362/297 X
4,841,423 6/1989 Luciani ........................ 362/297 X

*Primary Examiner*—Stephen F. Husar

[57] ABSTRACT

A motor vehicle headlight of the type comprising a lamp having a filament (100), a reflector (200) defining an optical axis (Ox), and a closure glass (300), the filament emitting light freely in all radial directions thereabout and the reflector having a smooth and essentially continuous reflecting surface which reflects the rays emitted by the filament in such a manner as to cause the majority of them to be situated beneath a cut-off (hHc; hh) constituted by two half-planes of given height and slope. According to the invention the reflecting surface comprises a central zone (201*i*–206*a;* 210) which reflects rays from the filament so that they propagate in planes which are essentially vertical, two intermediate zones (201*m,* 203*m,* 205*m;* 202*m,* 204*m,* 206*m;* 220, 230) situated on either side of the central zone and connected thereto with continuity, which intermediate zones reflect the light rays from the filament by imparting a substantial deflection thereto in planes essentially parallel to the cut-off half-plane with the rays participating in defining the cut-off, and at least one peripheral zone (201*e,* 203*e,* 205*e;* 202*e,* 204*e,* 206*e;* 240, 250) situated beyond one or both intermediate zones and being connected thereto with continuity, the peripheral zone(s) reflecting the rays from the filament so that they propagate in planes which are essentially vertical and parallel to the optical axis.

8 Claims, 9 Drawing Sheets

FIG. 5
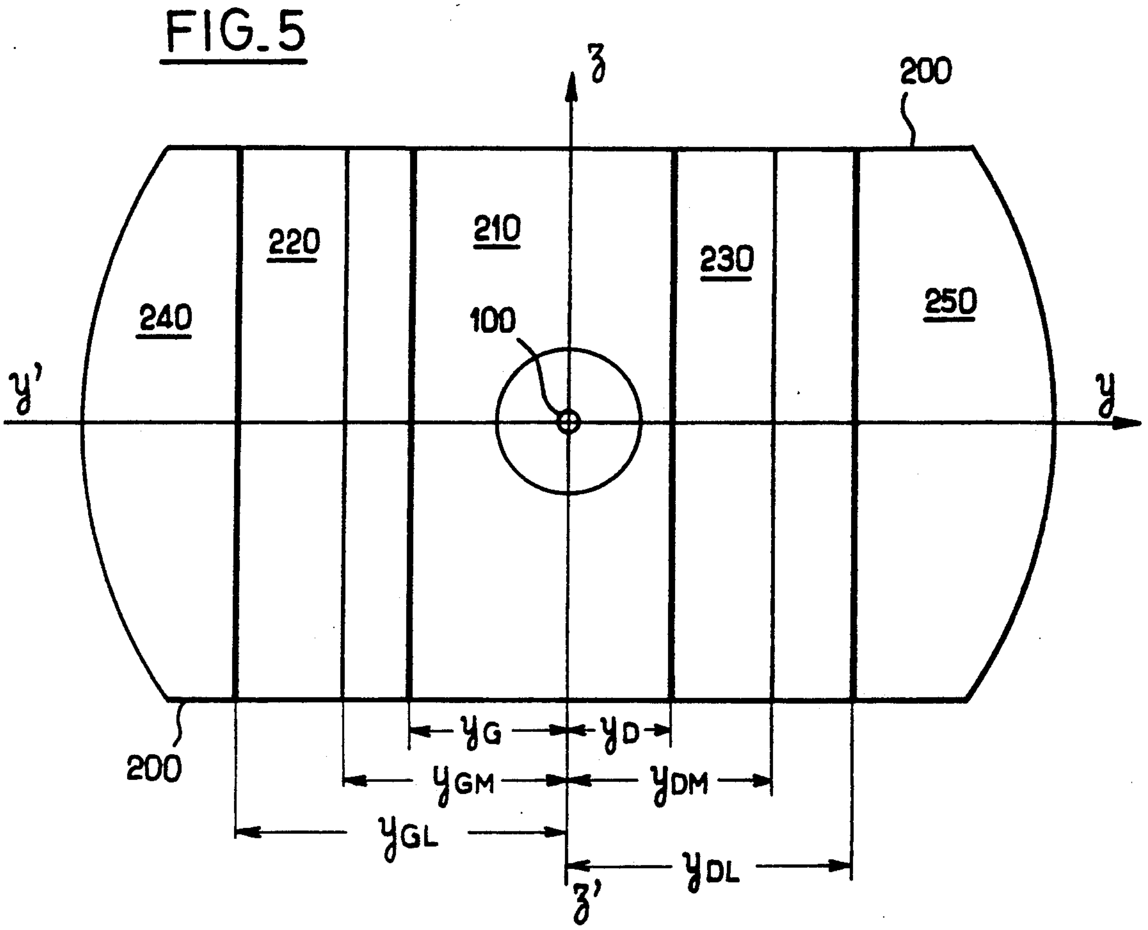
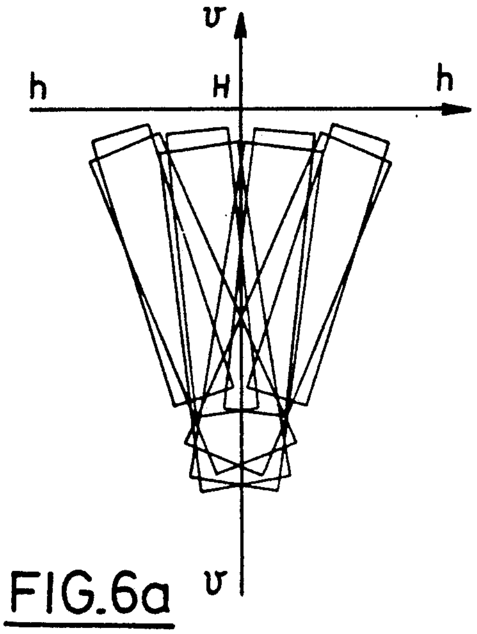
FIG. 6a
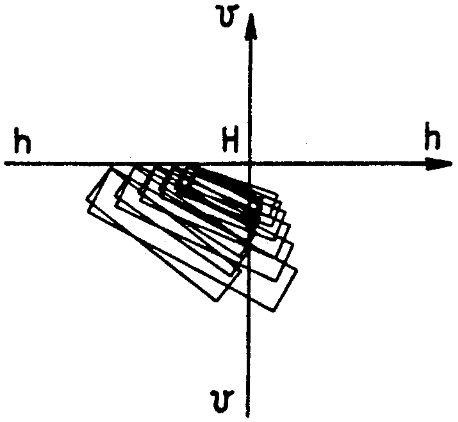
FIG. 6d

MOTOR VEHICLE HEADLIGHT HAVING A REFLECTOR OF COMPLEX SURFACE SHAPE WITH MODIFIED INTERMEDIATE ZONESThe present invention relates in general to motor vehicle headlights, and more particularly to improvements to headlights that emit a beam having a cut-off, e.g. a European type dipped beam or a foglight beam, with the headlight including, for this purpose, a lamp whose filament emits freely in all directions around the filament and co-operates with a smooth reflector having a surface of complex shape designed specifically to produce the cut-off.

BACKGROUND OF THE INVENTION

More precisely, the invention relates to improvements to headlights of this type in which the smooth surface of the reflector is also designed to impart considerable width to the beam without help from the closure glass. This avoids the well-known optical defects that appear, in particular when a large amount of lateral deflection is required of a closure glass which slopes relative to the vertical.

Headlights of this type are described in our earlier French patent application published under the number 2 609 148.

However, in all these prior headlights, the deflection imparted to the light rays reflected by the reflector always occurs in a horizontal plane. In particular, this means that for a European type dipped headlight, the rays which normally define the sloping half cut-off of this type of beam are moved away from the half cut-off by such deflection. In practice, this gives rise to a horizontal half cut-off which is well defined over a wide width, whereas the half cut-off which slopes relative to the horizontal is defined only over a very narrow width. This is clearly illustrated in FIG. 13 of the above-mentioned patent application where it can be seen that the sloping half cut-off is extended to the right merely by an extension of the horizontal half cut-off on the left.

In addition, in the headlights described in said patent application, the width of the beam is obtained essentially by the design of the central region of the complex reflector. This is not always compatible with having a direct light mask disposed in front of the lamp. Although it gives rise to a beam of the required width by reinforcing the convergence of the rays reflected on the back, a large proportion of these rays are then intercepted by the mask and do not contribute to the beam. Light output is thus reduced.

The present invention seeks to mitigate the drawbacks of the prior art and to provide a headlight having a cut-off beam of the above-mentioned type in which, solely by an appropriate design of the reflector which continues to have an essentially continuous and smooth surface, a substantial increase is obtained in beam width not only horizontally, but also, where appropriate, essentially parallel to the sloping portion of the cut-off, and in particular along the upwardly-directed lift angle of the cut-off along the sloping half cut-off of a standardized European dipped beam.

A secondary object of the present invention, when the lamp used includes a direct light mask placed in front of the lamp, is to minimize the quantity of light which is directed towards the mask after being reflected on the reflector, and which therefore does not contribute to forming the beam.

SUMMARY OF THE INVENTION

To this end the present invention provides a motor vehicle headlight of the type comprising a lamp having a filament, a reflector defining an optical axis, and a closure glass, the filament emitting light freely in all radial directions thereabout and the reflector having a smooth and essentially continuous reflecting surface which reflects the rays emitted by the filament in such a manner as to cause the majority of them to be situated beneath a cut-off constituted by two half-planes of given height and slope, wherein the reflecting surface comprises a central zone which reflects rays from the filament so that they propagate in planes which are essentially vertical, two intermediate zones situated on either side of the central zone and connected thereto with continuity, which intermediate zones reflect the light rays from the filament by imparting a substantial deflection thereto in planes essentially parallel to the cut-off half-plane to the definition of which the rays participate, and at least one peripheral zone situated beyond one or both intermediate zones and being connected thereto with continuity, the peripheral zone(s) reflecting the rays from the filament so that they propagate in planes which are essentially vertical and parallel to the optical axis.

Preferred features of a headlight of the invention include the following:

two peripheral zones situated beyond respective ones of the two intermediate zones;

for a headlight in which the cut-off is constituted by a horizontal half-plane and by a half-plane sloping up from a horizontal plane by an angle referred to as the cut-off lift angle, corresponding to a European dipped beam, the filament is disposed parallel to the optical axis and above the optical axis so that its light-emitting surface is substantially tangential to said optical axis, the reflector is additionally subdivided into two first zones based on portions of paraboloids extending symmetrically on either side of the optical axis between two planes including the optical axis, one of said planes being horizontal and the other sloping relative to the horizontal at the cut-off lift angle, two second zones extending said first zones respectively above and below said zones and forming images of the filament in which the topmost points lie in the vicinity of the cut-off, and the central zone, the intermediate zones, and the peripheral zone(s) are respectively constituted by inner subzones, intermediate subzones, and outer subzones in each of said first and second zones;

the central zone and the peripheral zone(s) have different design focal lengths;

when projected onto a plane perpendicular to the optical axis, the intermediate subzones of said first zones of the reflector are laterally delimited by portions of circles, whereas the intermediate subzones of said second zones are laterally delimited by segments of straight lines perpendicular to the cut-off half-planes in question, with straight lines being tangential to the ends of the associated protions of circles; and for a headlight also including a direct light mask disposed in front of its lamp, the distance between the center of the reflector and the beginnings of the intermediate zones is selected to be large enough to prevent the rays that are deflected inwards by the intermediate zones being intercepted by said mask.

BRIEF DESCRIPTION OF THE DRAWINGS

Embodiments of the invention are described by way of example with reference to the accompanying drawings, in which:

FIG. 5 is a front view of a foglight in accordance with the present invention, with its closure glass omitted and with its lamp being represented solely by its filament;

FIGS. 6*a* to 6*d* are sets of filament images projected on a screen illustrating the illumination provided by various zones of the FIG. 5 reflector in the absence of its closure glass;

DETAILED DESCRIPTION

Figure 1A:
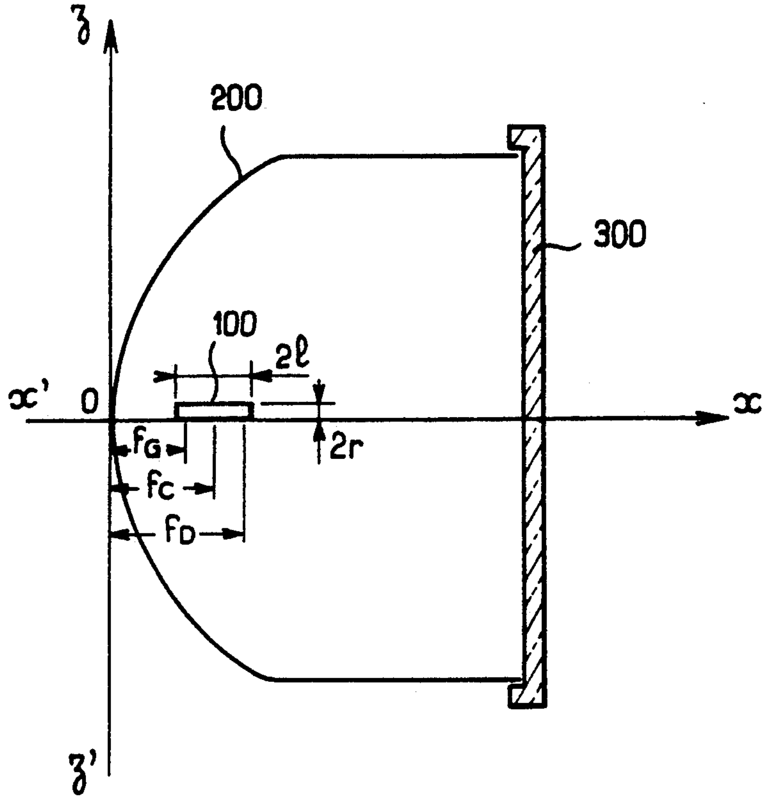
FIG. 1*a* is a side view in section through a European dipped headlight in accordance with the present invention, with its lamp being represented solely by its filament.
Figure 1B:
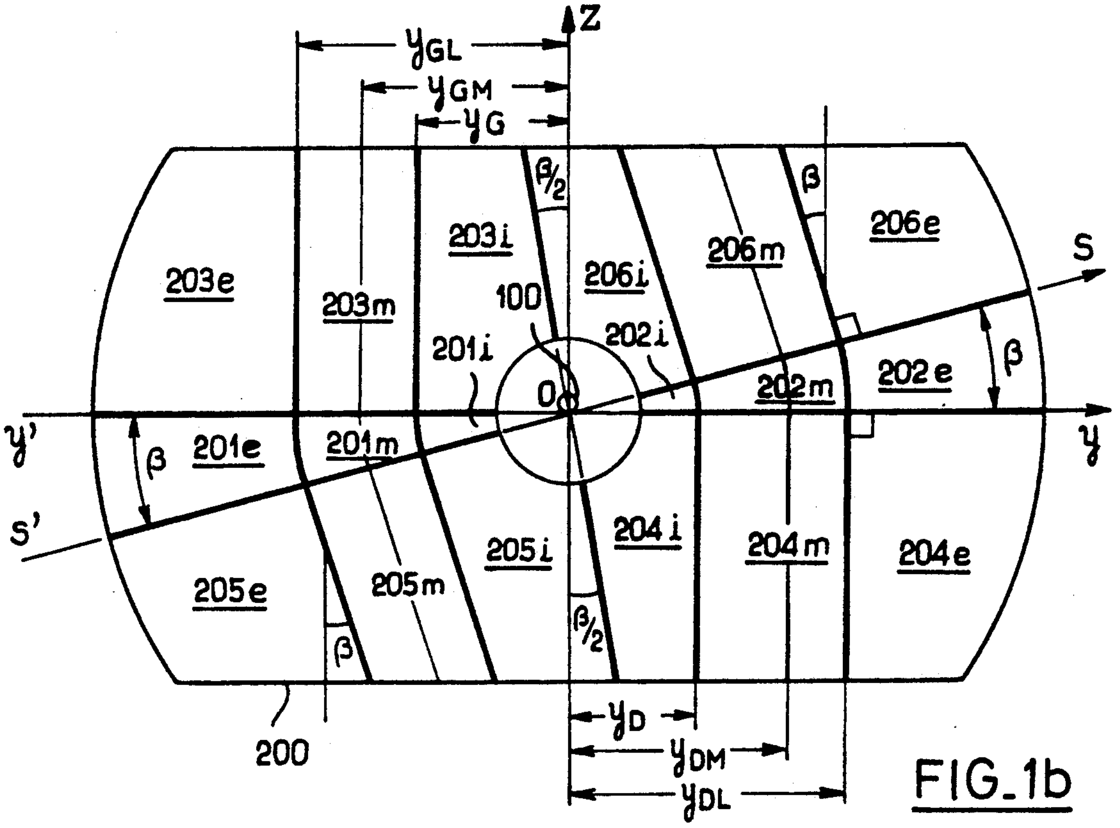
FIG. 1*b* is a view of the back of the headlight shown in FIG. 1*a* and with its closure glass removed.

Reference is made initially to FIGS. 1*a* and 1*b* which show a dipped beam headlight closure a closure glass 300, a reflector 200 having a complex surface shape, and a lamp (outline not shown) provided with an axial filament 100 and represented by a cylinder of length 2*l* and of radius r, disposed parallel to the optical axis Ox in such a manner that its bottom surface is essentially tangential to said axis.

The reflector is divided into six zones 201 to 206 each having a specific optical function, with said zones being themselves second order continuous and also meeting one another in planes as shown and with second order continuity (apart from the connections between the zones 204 & 205 and 203 & 206 respectively where continuity is only first order).

A headlight of this type is described in our U.S. Pat. Nos. 4,530,042 and 4,772,988, and the content thereof is incorporated into the present description by reference, and further details may be found therein.

In accordance with an essential feature of the invention each of the zones 201 to 206 is constituted only in part in accordance with the equations specified in the above-mentioned patent applications, while being modified in certain regions relative to said equations, as is now described with reference to FIGS. 2*a* to 2*c*.

Each of these figures is a horizontal section through the zone 205 with all of the light rays being shown as vertical projections onto the horizontal plane of the section.

Figure 2A:
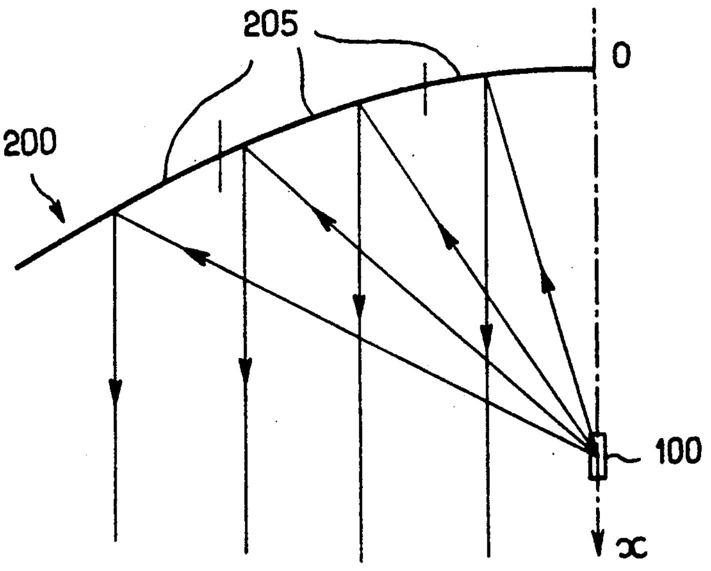
FIGS. 2*a* to 2*c* are diagrammatic cross-section views through the reflector showing the principle on which the present invention is based.

FIG. 2*a* represents a headlight in accordance with above-mentioned U.S. Pat. No. 4,530,042. As can be seen, all of the rays reflected by the zone 205 travel approximately in respective vertical planes parallel to the optical axis Ox. The beam produced is thus relatively narrow and width is imparted thereto by the closure glass which includes appropriate prisms or stripes.

Figure 2B:
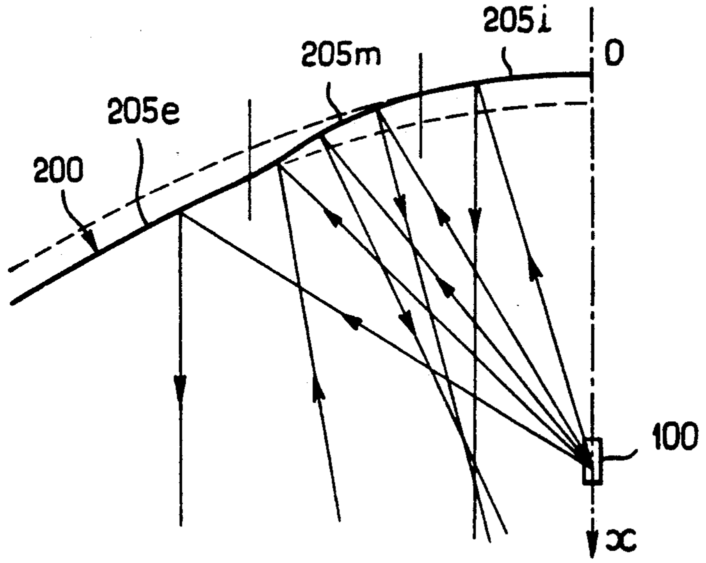
Figure 2C:
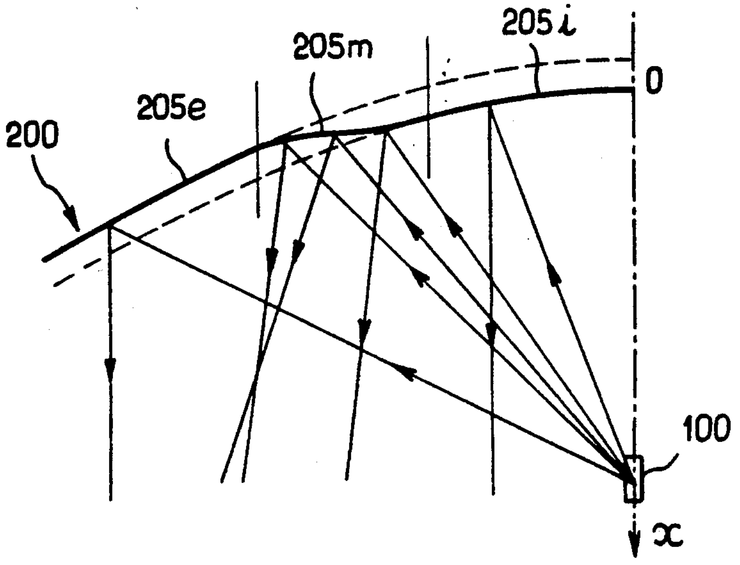

FIGS. 2*b* and 2*c* show the principle on which the invention is based. In this case, the zone 205 has an inner subzone **205*i* and an outer subzone 205*e* whose surface are identical to the surface of the zone 205** in FIG. 2*a*, except insofar as the design focal lengths of the two zones are different. An intermediate zone **205*m*** is also defined whose profile diverges from the prior art surface so as to give rise to reflected rays which may have either a given degree of convergence (FIG. 2*b*), or else a given degree of divergence (FIG. 2*c*). According to the invention, the various subzones have second order continuous surfaces, and in addition they meet one another in transition planes with second order continuity. It should be observed at this point that the differences between the prior art surface and the surface modified in accordance with the invention are shown greatly exaggerated for reasons of clarity.

According to an essential feature of the present invention, the great width conferred to the portion of the beam delivered by the zone 205 is obtained firstly by taking advantage of the sloping half cut-off generated per se by said zone, but above all, by deflecting the light rays in the intermediate zone, not horizontally but in a plane parallel to the cut-off. Thus, as described in greater detail below, the V-shaped cut-off of the beam is defined over a wide extent laterally.

In practice, each of the zones 201 to 206 includes its own inner subzone, with respective references **201*i* to 206*i*, its own intermediate subzone, with respective references 201*m* to 206*m*, and its own outer subzone, with respective references 201*e* to 206*e***.

The inner and outer subzones satisfy the above-mentioned equations, but naturally, the design focal length used in each inner subzone is different from that used in each outer subzone.

In other words, the subzones **201*i* & 201*e* and 202*i* & 202*e* are portions of circularly symmetrical paraboloids, having either the same focus situated on the optical axis level with the middle of the filament, or else two distinct focuses situated in the vicinity of respective ones of the two axial ends of the filament, and also having different focal lengths, in pairs. In addition, the inner zones 203*i* to 206*i* and the outer zones 203*e* to 206*e* are zones having complex surfaces as mathematically defined in the above-mentioned patent applications, and thus having the properties mentioned therein. It is recalled herein that the purpose of such a reflector is to use its zones 201 and 202 to begin the V-shaped cut-off of the general type described in the introduction, and to use its zones 203 to 206** to extend said cut-off by giving rise to images of the filament at all points situated below said cut-off.

In accordance with the present invention, each of the intermediate subzones **201*m* to 206*m* locally modifies the profile of the zone in question in order to confer the required width to the beam, as shown above for subzone 205*m***. More precisely, each intermediate subzone has the property of providing a second order continuous connection between the associated inner and outer subzones which are offset relative to each other, and as a result the intermediate subzone has a profile including two opposite curvatures interconnected by a line of inflection, as is clearly shown in FIGS. 2*b* and 2*c*. Each intermediate subzone also has the property of connecting with the immediately adjacent intermediate subzone with second order continuity.

Optically, each intermediate subzone has the function of deflecting light rays in a direction which is essentially parallel to the portion of the cut-off that is defined by the zone in question, such that the various portions of said cut-off are defined over a large width. In particular, the intermediate subzones 203*m* and 204*m* of complex surface zones 203 and 204 widen the portion of the beam under consideration horizontally beneath the horizontal half cut-off hH of a standardized European dipped beam, while the intermediate subzones 205*m* and 206*m* in the complex surface zones 205 and 206 widen the corresponding portion of the beam beneath the half cut-off Hc that slopes at 15°, and they achieve this by deflecting light rays parallel to said half cut-off.

In the projection on the plane yOz constituted by FIG. 1*b*, the intermediate subzones 201*m* and 202*m* are delimited by circular arcs centered on the center O of the reflector, whereas the intermediate subzones 203*m* and 204*m* are delimited by vertical line segments, and the intermediate subzones 205*m* and 206*m* are delimited by line segments sloping at an angle $\beta$ relative to the vertical, i.e. perpendicular to the half-plane of the sloping cut-off Hc. In addition, all of the intermediate subzones situated on the same side of the optical axis run into one another, as shown.

A mathematical approach is now used for defining an embodiment of a reflector in accordance with this first aspect of the invention, but it should naturally be understood that other examples are possible without going beyond the scope of the invention.

In FIG. 1*b*, the following parameters are shown:

$Y_G$ is the distance between the axis Ox and the inside edge of the group of intermediate subzones 201*m*, 203*m*, and 205*m* situated to the left of the optical axis;

$Y_{GM}$ is the distance between the axis Ox and the center of said group (where the term "center" designates the vertical or sloping straight line, or portion of a circle, at the point of inflection in each of the intermediate subzones);

$Y_{GL}$ is the distance between the center O and the outer edge of the group of intermediate subzones 201*m*, 203*m*, and 205*m*;

$Y_D$, $Y_{DM}$, and $Y_{DL}$ have the same meanings as $Y_G$, $Y_{GM}$, and $Y_{GL}$ but for the intermediate subzones on the right of FIG. 1*b*, i.e. subzones 202*m*, 204*m*, and 206*m*;

$f_G$, $f_C$, $f_D$ are the design focal lengths of the left-hand portions (subzones 201*e*, 203*e*, and 205*e*), of the central portions (subzones 201*i* to 206*i*), and of the righthand portions (subzones 202*e*, 204*e*, and 206*e*) of the reflector;

$A_{GL}$ and $A_{GM}$ are parameters specifying the amount of reflector deformation in the lefthand intermediate zones 201*m*, 203*m*, and 205*m*; and $A_{GL}$ and $A_{GM}$ are identical parameters, but applicable to the righthand intermediate subzones 202*m*, 204*m*, and 206*m*.

In order to design a reflector in accordance with the invention, the "y" dimensional parameters defined above and the focal length $f_G$ are initially selected, and then the width to be imparted to the beam is selected, with the width being represented by angular apertures in planes parallel to the two half cut-offs of the portions of the beam generated by the left and right intermediate subzones. These angular apertures are respectively written $\theta_G$ and $\theta_D$.

The parameters $A_{GL}$ and $A_{DL}$ are defined by:

$$A_{GL}=(\tan\theta_G)/(Y_{GM}-Y_{GL}) \quad (1)$$

$$A_{DL}=(\tan\theta_D)/(Y_{DM}-Y_{DL}). \quad (2)$$

The value of $f_C$ is then determined by writing:

$$f_C=f_G+\delta f_G \quad (3)$$

where $\delta f_G$ is selected as being equal to the larger of the solutions to the following second degree equation:

$$4X^2+4(AA+f_G)X-Y_G\cdot Y_{GM}+4AA.f_G=0 \quad (4)$$

where $$AA=\tfrac{1}{4}A_{GL}(Y_G-Y_{GL})\cdot(Y_{GM}-Y_{GL})+\tfrac{1}{4}(Y_G\cdot Y_{GM})/f_G \quad (5)$$

The parameter $A_{GM}$ is then calculated using the following equation:

$$A_{GM}=[\tfrac{1}{4}(Y_G/f_C)-\tfrac{1}{4}(Y_G/f_G)-A_{GL}(Y_G-Y_{GL})]/(Y_G-Y_{GM}) \quad (6)$$

Similarly, the focal length $f_D$ is calculated by writing:

$$f_D=f_C+\delta f_D \quad (7)$$

where $\delta f_D$ is the greater of the solutions to the equation:

$$-4X^2+4(BB+f_C)X+4f_C\cdot BB+Y_D\cdot Y_{DM}=0 \quad (8)$$

where $$BB=\tfrac{1}{4}A_{DL}(Y_D-Y_{DL})\cdot(Y_{DM}-Y_{DL})-\tfrac{1}{4}(Y_D\cdot Y_{DM})/f_C$$

Thereafter, $A_{DM}$ is calculated as follows:

$$A_{DM}=[\tfrac{1}{4}(Y_D/f_C)-\tfrac{1}{4}(Y_D/f_D)-A_{DL}(Y_D-Y_{DL})]/(Y_D-Y_{DM}) \quad (10)$$

All of the parameters are thus defined, some of them being selected by the designer and the others being calculated as specified above on the basis of the design selections.

The equations for the various zones 201 to 206 of the reflector are now specified in a rectangular frame of reference [O,x,y,z] as shown in FIGS. 1*a* and 1*b*.

For the zones 203 and 204, equation (11) is as follows:

$$x=\frac{z^2}{4f_O+\dfrac{-\epsilon l-\frac{1}{2}\alpha\cdot(|y|-y_L)^2-\frac{1}{2}\alpha'\cdot(|y|-y_M)^2-V^2\cdot f_O}{1+\frac{1}{4}(y/f_O)^2+V\cdot\alpha_1\cdot(y/f_O)+V^2}}+\frac{1}{4}y^2/f_O+\frac{1}{2}\alpha(|y|-y_L)^2+\frac{1}{2}\alpha'(|y|-y_M)^2$$

where $V=(\alpha+\alpha')|y|-\alpha y_L-\alpha' y_M$.

In this equation, l represents the half length of the filament, $\alpha_1$ is equal to $y/|y|$, and $\epsilon$ is equal to $z/|z|$. In addition, the values taken by the parameters $\alpha$, $\alpha'$, $y_L$, $y_M$, and $f_0$ which appear for the first time in this equation vary as a function of the Y coordinate along the axis y'Oy, and are given in the following table I:

| | | | | | | | | | | | | | | | |
|---|---|---|---|---|---|---|---|---|---|---|---|---|---|---|---|
| y | | $-y_{GL}$ | | $-y_{GM}$ | | $-y_G$ | | O | | $y_D$ | | $y_{DM}$ | | $y_{DL}$ | |
| $\alpha$ | O | | $A_{GL}$ | | $A_{GL}$ | | O | | O | | $A_{DL}$ | | $A_{DL}$ | | O |
| $\alpha'$ | O | | O | | $A_{GM}$ | | O | | O | | $A_{DM}$ | | O | | O |
| $y_L$ | $y_{GL}$ | | $y_{GL}$ | | $y_{GL}$ | | $y_{GL}$ | | $y_{DL}$ | | $y_{DL}$ | | $y_{DL}$ | | $y_{DL}$ |
| $y_M$ | $y_{GM}$ | | $y_{GM}$ | | $y_{GM}$ | | $y_{GM}$ | | $y_{DM}$ | | $y_{DM}$ | | $y_{DM}$ | | $y_{DM}$ |
| $f_O$ | $f_G$ | | $f_G$ | | $f_G$ | | $f_C$ | | $f_C$ | | $f_D$ | | $f_D$ | | $f_D$ |

The reflecting surfaces of the zones 205 and 206 are defined by equation (11) above, but by replacing the coordinate x, y, and z by coordinates X, Y, and Z defined as follows:

$Y = y \cdot \cos l + z . \sin l$ $Z = -y \cdot \sin l + z . \cos l$

The resulting new equation, which is not written out in full in order to avoid complicating the description, is referred to as equation (12).

It may be observed that this coordinate change has the practical effect of rotating the surface defined by equation (11) about the axis Ox through an angle l which is the lift angle of the righthand half cut-off of the beam.

Finally, the reflecting surfaces of the zones 201 and 202 are defined by the following equation:

$$x = \tfrac{1}{4}\rho^2/f_0 + \tfrac{1}{2}\alpha.(|\rho| - y_L)^2 + \tfrac{1}{2}\alpha'.(|\rho| - y_M)^2 \quad (13)$$

where $\rho = \sqrt{(y^2 + z^2)}$.

The values of the parameters appearing in this equation likewise vary as a function of the position of the Y-coordinate along the Y axis y'Oy, as specified in Table I above.

FIGS. 3a to 3g show images of the filament 100 on a standardized projection screen [H,h,v], thereby showing the distribution of light obtained using the various subzones of the reflector described in detail above. The following table shows how each of these figures corresponds to one or more of the subzones in question:

| Figure | Subzone(s) |
|---|---|
| 3a | 201i to 206i |
| 3b | 201m, 205m |
| 3c | 202m, 206m |
| 3d | 204m |
| 3e | 203m |
| 3f | 201e, 202e, 205e, 206e |
| 3g | 203e, 204e |

Figure 3A:
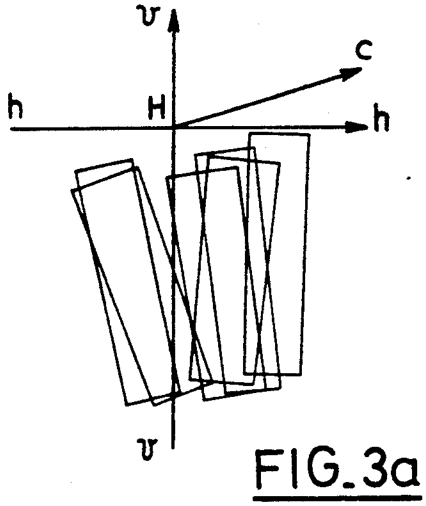
FIGS. 3*a* to 3*g* are sets of images of the filament projected onto a projection screen, showing the illumination provided by various different zones of the reflector of FIGS. 1*a* and 1*b*, in the absence of the closure glass.
Figure 3B:
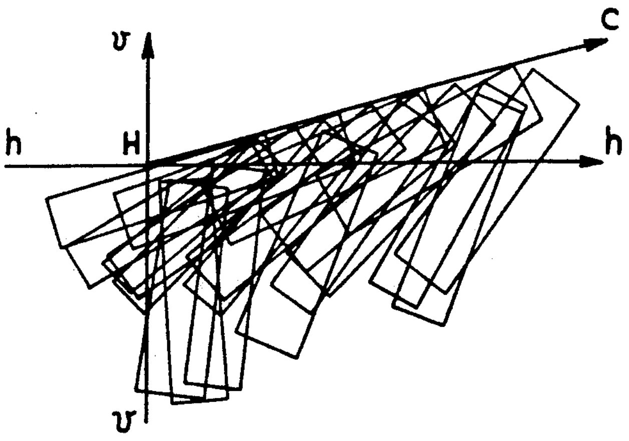
Figure 3C:
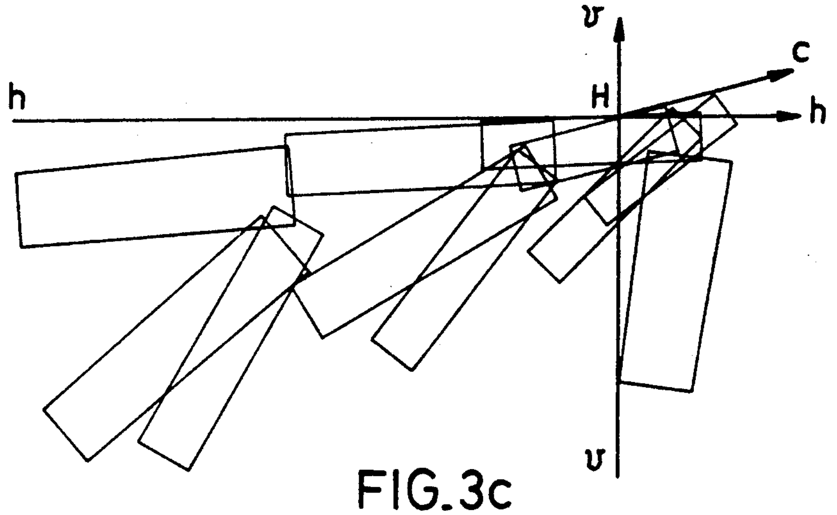
Figure 3D:
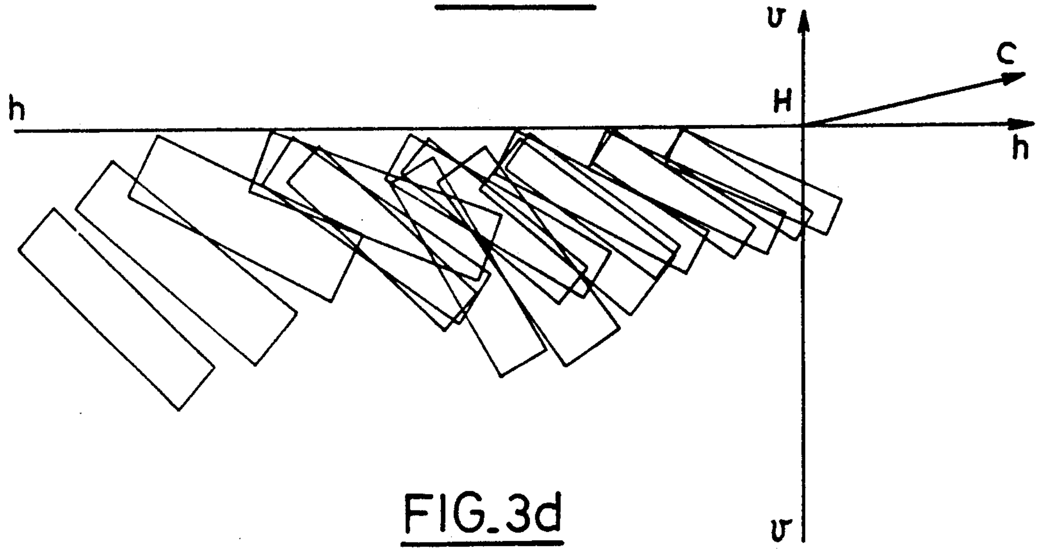
Figure 4:
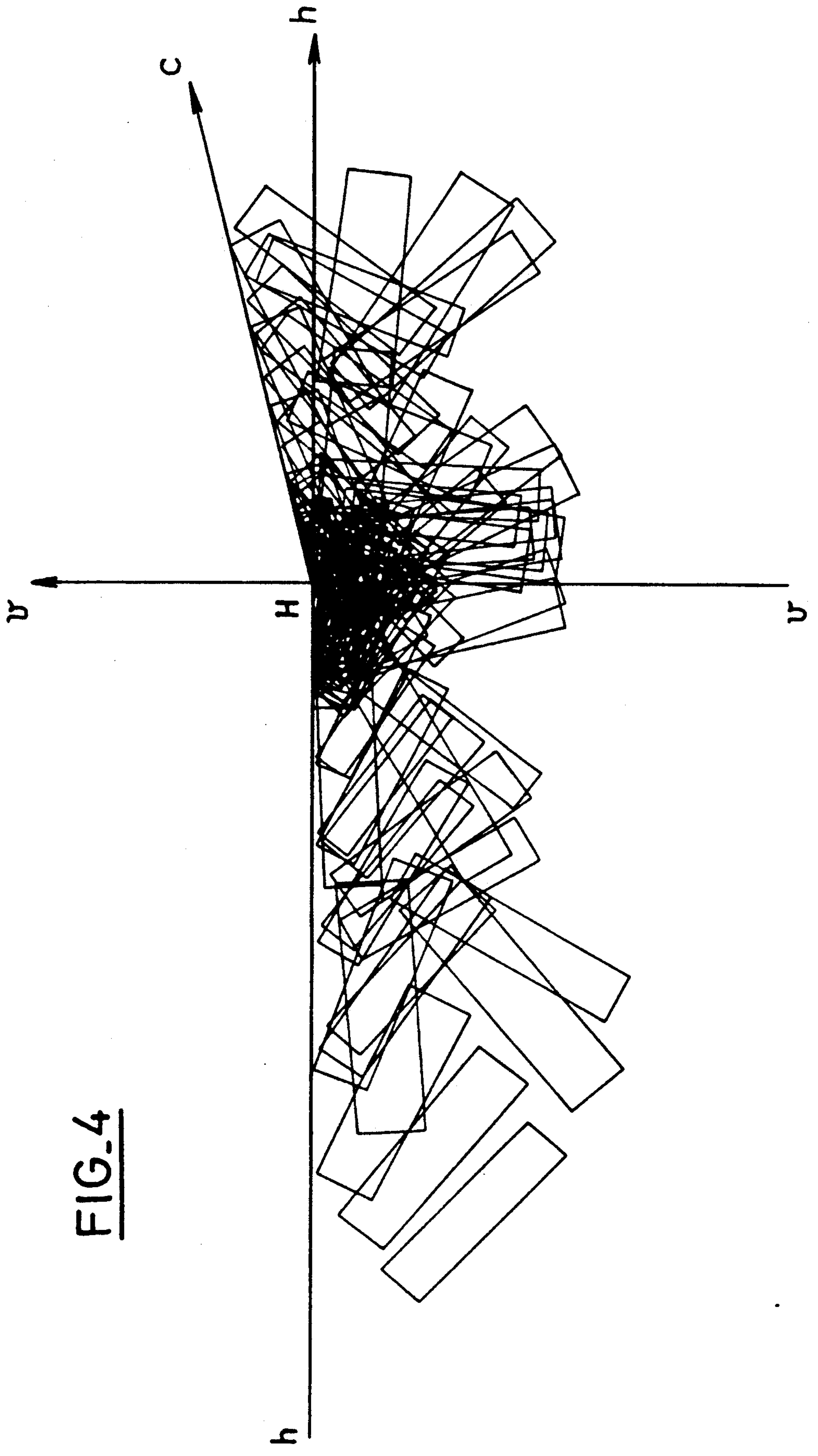
FIG. 4 is a similar view showing the overall illumination provided by the headlight of FIGS. 1*a* and 1*b*, in the absence of its closure glass.
Figure 3E:
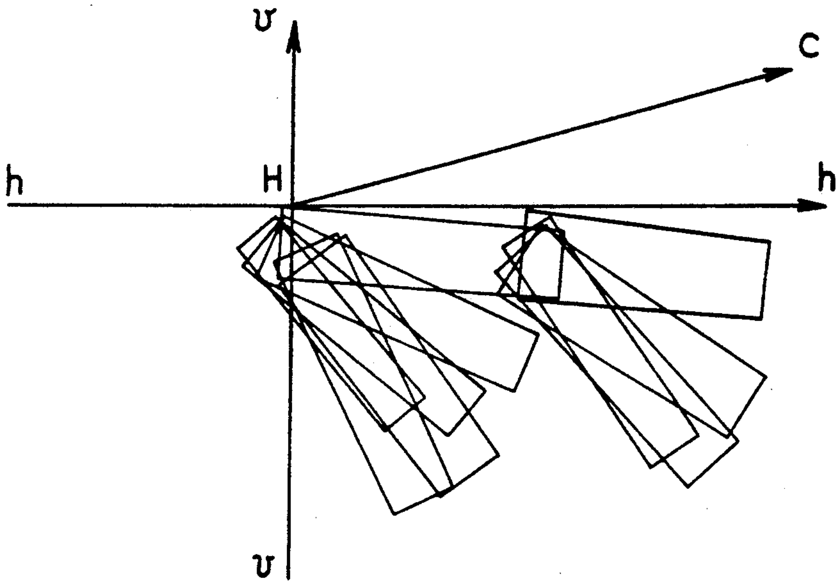
Figure 3F:
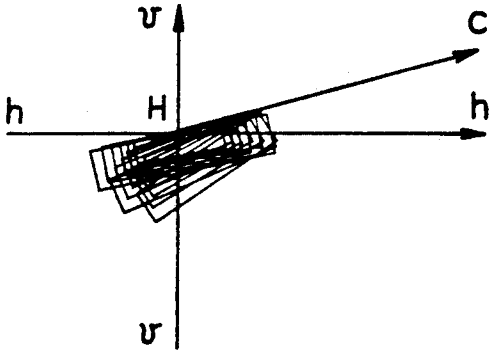
Figure 3G:
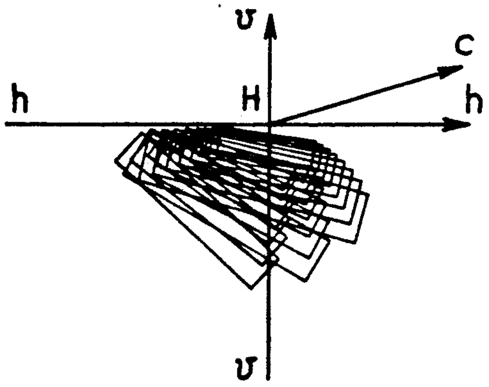

As can be seen in FIG. 3b, the intermediate zones 201m and 205m do not spread the corresponding portion of the beam laterally along hh, but along the sloping half cut-off Hc. This cut-off is thus extended sideways over a substantial width with definition that remains excellent. In practice, this corresponds to increasing the range of the dipped headlight along the side of the road, thereby making driving easier, as is clearly shown in FIG. 4 which shows the distribution of light given by the entire reflector, likewise in the form of filament images projected onto [H,h,v].

FIG. 5 is a front view of a reflector in accordance with the present invention and suitable for being used to provide a foglight beam, i.e. beam which is delimited by a cut-off having two horizontal half-planes which are both situated at the same level.

The reflector 200 comprises a central zone 210, two intermediate zones 220 and 230, and two outer zones 240 and 250.

The central zone and the outer zone are made in accordance with the teaching of U.S. Pat. No. 4,530,042 and the description is incorporated herein by reference, and should be referred to for obtaining further details. It may merely be mentioned that said document teaches a reflector having a smooth surface whose shape is designed so that it, itself generates the above-mentioned horizontal cut-off. The only difference relative to said prior patent specification lies in that different design focal lengths are used in each of the three zones.

The intermediate zones 220 and 230 are constructed in the same manner as the subzone 205m of FIGS. 2b and 2c. More precisely, and using the same parameters for the surface of the reflector as in FIGS. 1a and 1b, the overall equation for the surface of the reflector in this second embodiment of the invention is identical to equation (11) described above.

In this case, since both half cut-offs are horizontal, the deflection imparted to the rays by the intermediate zones take place in horizontal planes.

FIGS. 6a to 6d show the light distribution obtained from each of the zones of this reflector in the form of images of the filament as generated by the bare reflector and projected on a standardized screen [H,h,v].

Figure 6B:
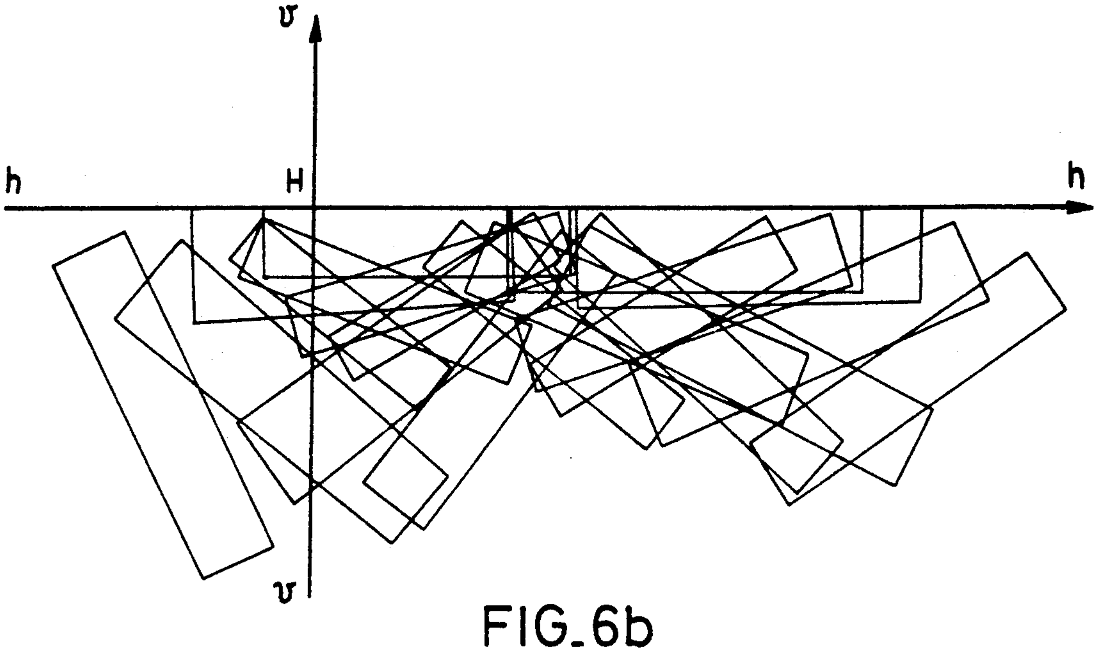
Figure 6C:
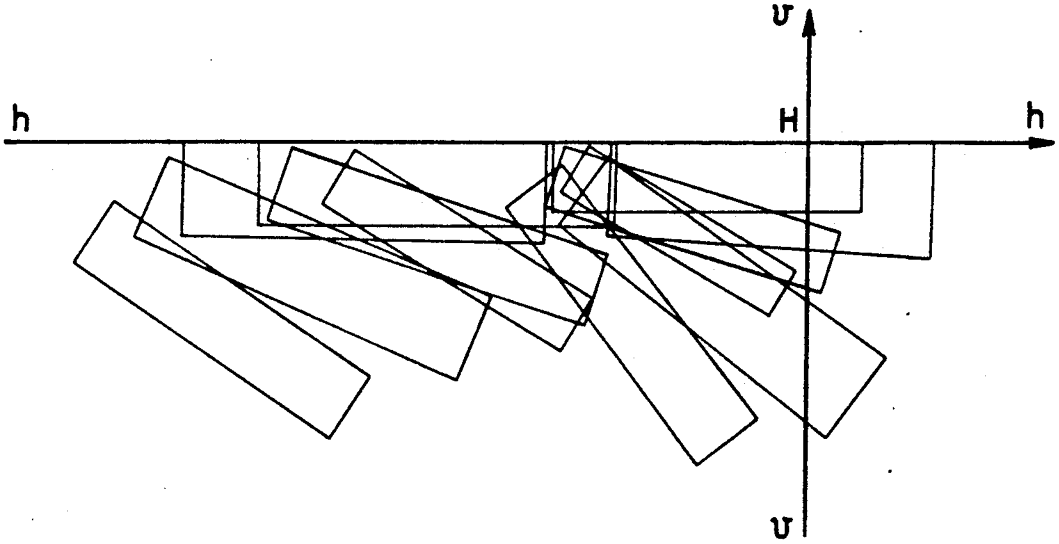

FIG. 6a corresponds to the central portion 210 of the reflector. FIG. 6b corresponds to the lefthand intermediate portion 220, FIG. 6c corresponds to the righthand intermediate portion 230 which is a mirror image of FIG. 6b (but fewer images are shown to avoid overcrowding), and FIG. 6d corresponds to the outer zones 240 and 250.

Figure 7:
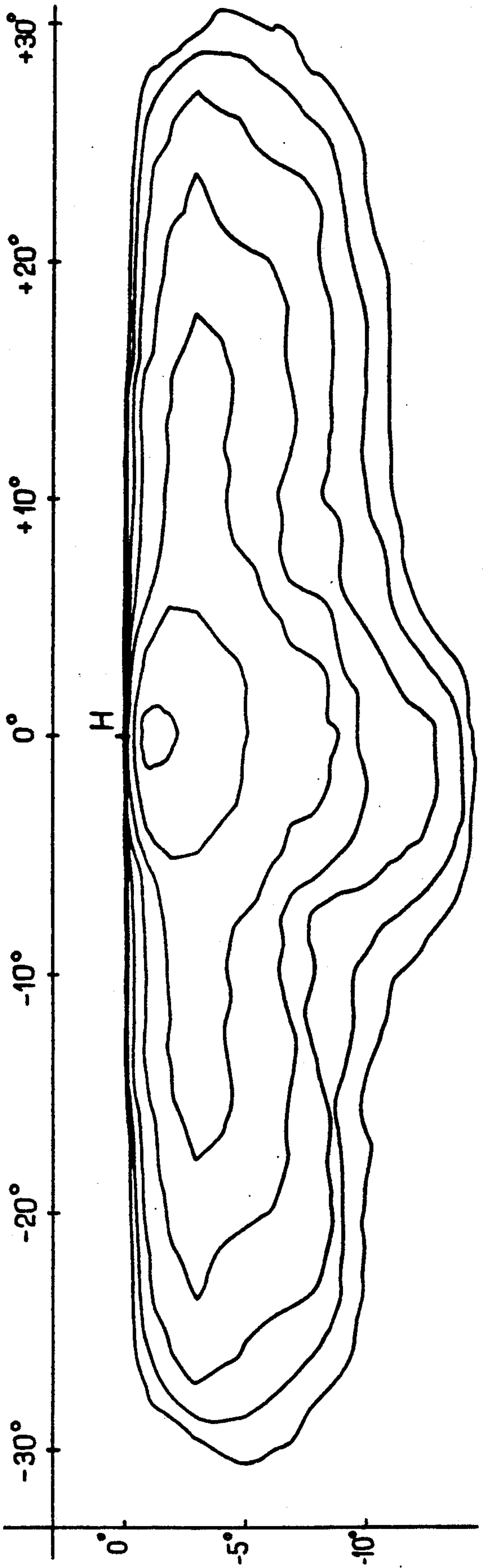
FIG. 7 is a set of isocandela curves on a projection screen representing all of the illumination provided by the FIG. 5 light without its closure glass.

FIG. 7 shows a set of isocandela curves as obtained on the same projection screen, thereby demonstrating the distribution of light obtained from the entire reflector.

It can be seen that the horizontal cut-off is very cleanly defined over a wide width.

Figure 8B:
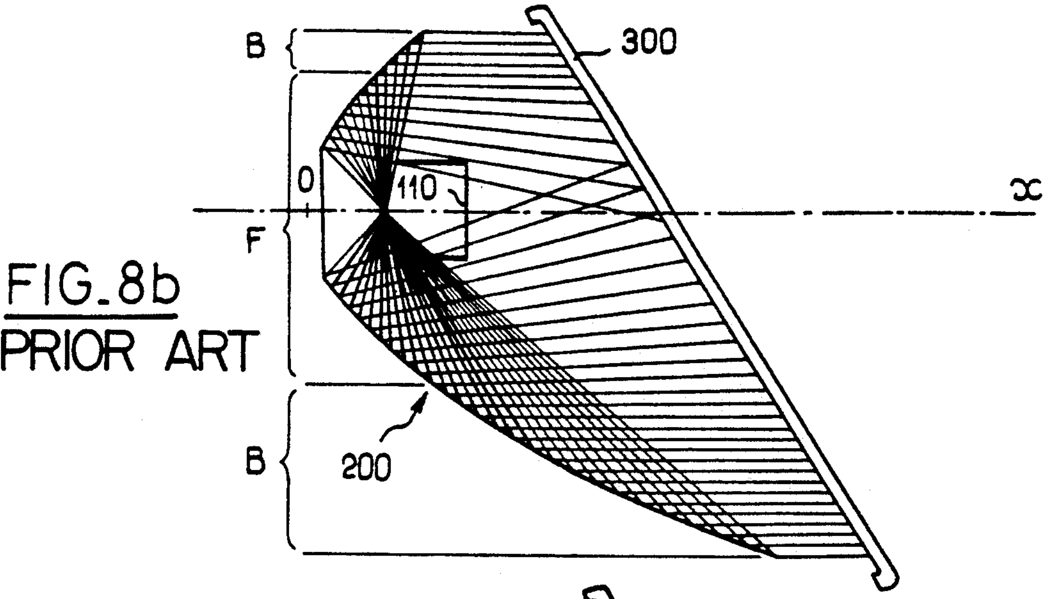
FIG. 8b PRIOR ART
FIGS. 8*a* to 8*c* are diagrammatic horizontal sections showing the horizontal distribution of light rays reflected by two prior art headlights and by a headlight in accordance with the present invention.
Figure 8A:
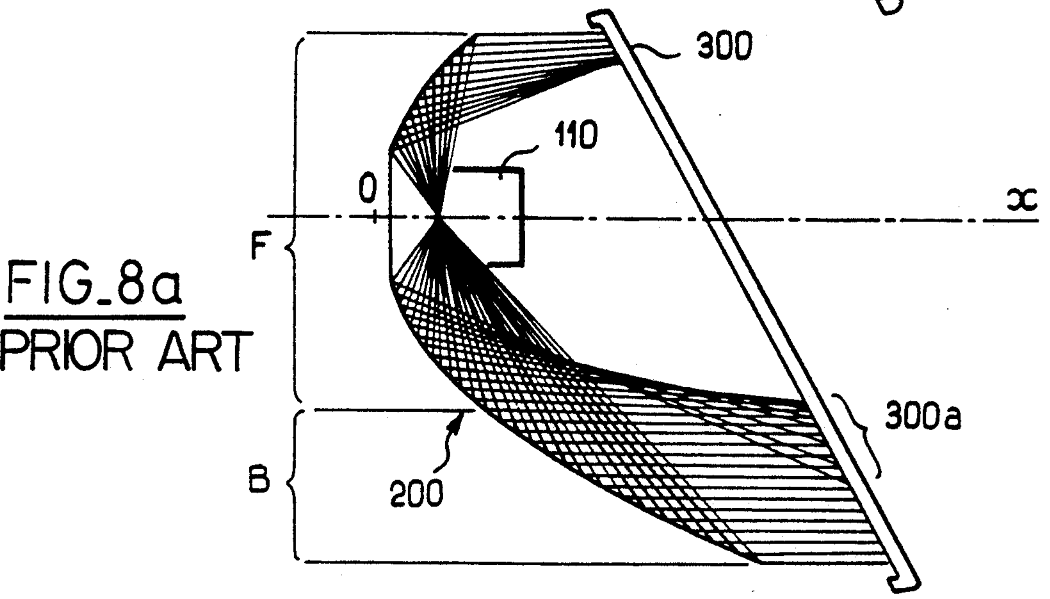
FIG. 8a PRIOR ART
Figure 8C:
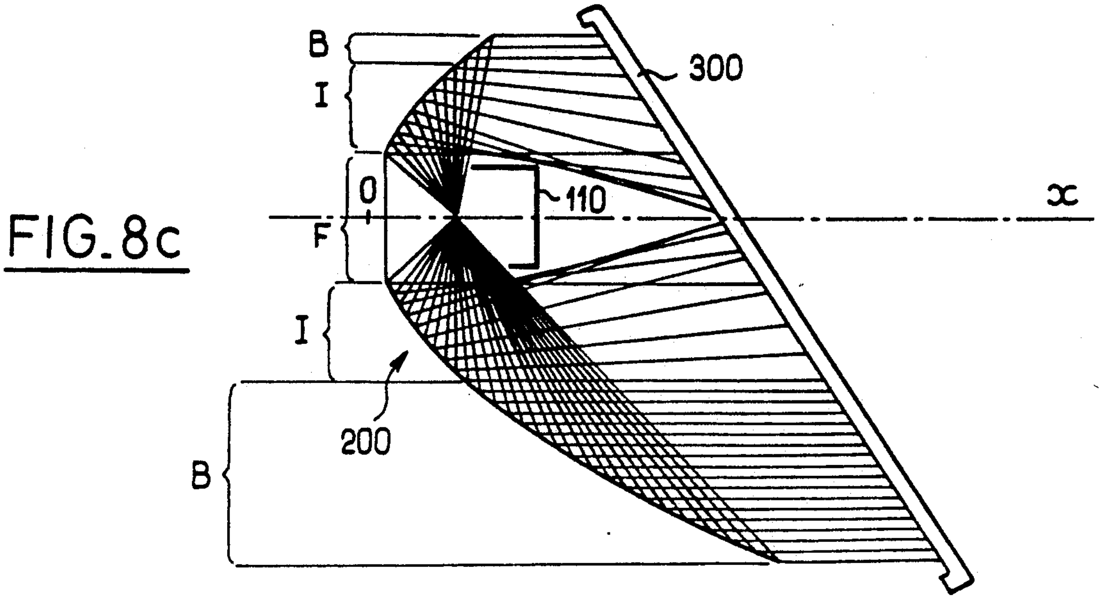

Reference is now made to FIGS. 8a to 8c for describing another advantage of the present invention compared with prior art headlights and applicable to headlights, be they dipped beam lights or foglights, which include a screen or mask for the direct light.

FIGS. 8a to 8c are horizontal sections through headlights including respective lamps (not shown), reflectors 200, and front glasses 300, and in this case the glasses are disposed at an angle. A direct light mask 110 is disposed in front of the lamp such that no light ray emitted by the filament can reach the glass 300 directly. Such a mask is generally in the form of a cylinder which is closed at its end furthest from the lamp and it serves in conventional manner to avoid rays leaving the lamp above the cut-off. This is to prevent oncoming drivers being dazzled.

In FIGS. 8a and 8b the reflector is made in accordance with French patent application number 2,609,148, i.e. its back is different from that of a conventional complex surface headlight and is intended to modify the convergence of the light rays reflected from said back. In FIG. 8*a*, the back F is divergent and this causes a large degree of mixing at the closure glass between the images generated by the back and the images generated by the peripheral portions B of the reflector (and more particularly in the zone 300*a* of the glass). It is thus not possible to use said glass to provide selective treatment for different portions of the beam, e.g. large images (from the back) giving the beam its width and its height, and small images (from the peripheral portions) giving the concentrated spot of the beam.

In contrast, when a convergent back F is used, the mixing of images at the glass is advantageously avoided. However, a non-negligible fraction of the rays reflected from the back is now intercepted by virtue of the convergence by the direct light mask 110. This results in a drop in the light output and also in a reduction in the width of the beam since it is the rays that are laterally inclined to the greatest extent that are intercepted.

A reflector in accordance with the present invention is shown in FIG. 8*c*. It can be seen that since the reflector is modified not in its back F but in intermediate regions I between the back F and the peripheral portions B, the advantages of both prior solutions as shown in FIGS. 8*a* and 8*b* are combined without their drawbacks: there is practically no mixing between the large images of the filaments as generated by the back and the intermediate zones with the small images as generated by the peripheral zone, and simultaneously the direct light mask does not intercept light on any significant scale. More precisely, the converging rays reflected by the modified zones I are far enough away from the mask to be able to travel past it (rays $R_1$ in FIG. 8*c*).

Naturally, the present invention is not limited to the embodiments described above and shown in the drawings, and the person skilled in the art will be able to make variants and modifications within the scope of the invention.

In particular, it is clear that the invention is applicable to headlights in which the reflector does not extend the same distance on both sides of the lamp, as shown in FIG. 8*c*. In the limit, the reflector could be constituted by one side zone only (e.g., with reference to FIG. 1*b*, by subzones 201*e*, 203*e*, and 205*e*) or the opposite outer subzones could be omitted, and with reference to FIG. 5, one or other of the zones 240 and 250 could be omitted.

In addition, the person skilled in the art will be capable of adapting the invention to a headlight providing a cut-off meeting the standards in force in the United States of America, as defined by two horizontal half-planes at different heights.

What is claimed:

1. A motor vehicle headlight of the type comprising a lamp having a filament, a reflector defining an optical axis, and a closure glass, the filament emitting light freely in all radial directions thereabout and the reflector having a smooth and essentially continuous reflecting surface which reflects the rays emitted by the filament in such a manner as to cause the majority of them to be situated beneath a cut-off constituted by two half-planes of given height and slope, wherein the reflecting surface comprises a central zone which reflects rays from the filament so that they propagate in planes which are essentially vertical, two intermediate zones situated on either side of the central zone and connected thereto with continuity, which intermediate zones reflect the light rays from the filament by imparting a substantial deflection thereto in planes essentially parallel to the cut-off half-plane to the definition of which the rays participate, and at least one peripheral zone situated beyond at least one intermediate zone and being connected thereto with continuity, the peripheral zone reflecting the rays from the filament so that they propagate in planes which are essentially vertical and parallel to the optical axis.

2. A headlight according to claim 1, wherein a second peripheral zone is situated beyond the other of said intermediate zones.

3. A headlight according to claim 1, in which the cut-off is constituted by a horizontal half-plane and a half-plane sloping above the horizontal by a cut-off lift angle and corresponding to a European dipped beam, wherein the filament is disposed parallel to the optical axis and above the optical axis so that its light-emitting surface is substantially tangential to said optical axis, wherein the reflector is additionally subdivided into two first zones based on portions of paraboloids extending symmetrically on either side of the optical axis between two planes including the optical axis, one of said planes being horizontal and the other sloping relative to the horizontal at the cut-off lift angle, two second zones extending said first zones respectively above and below said first zones and forming images of the filament in which the topmost points lie in the vicinity of the cut-off, and wherein the central zone, the intermediate zones, and the peripheral zone are respectively constituted by inner subzones, intermediate subzones, and outer subzones in each of said first and second zones.

4. A headlight according to claim 1, wherein the central zone and the peripheral zone(s) have different design focal lengths.

5. A headlight according to claim 3, wherein, when projected onto a plane perpendicular to the optical axis, the intermediate subzones of said first zones of the reflector are laterally delimited by portions of circles, whereas the intermediate subzones of said second zones are laterally delimited by segments of straight lines perpendicular to the cut-off half-planes in question, with the straight lines being tangential to the ends of the associated portions of circles.

6. A headlight according to claim 5, wherein the surfaces of the first zones of the reflector are defined by equation (13) $x=\frac{1}{4}\rho^2/f_0+\frac{1}{2}\alpha.(|\rho|-Y_L)^2+\frac{1}{2}\alpha'.(|\rho|-Y_M)^2$ where $\rho=\sqrt{(y^2+z^2)}$, whereas the surfaces of the second zones are defined by equations $$x = \frac{z^2}{4fo + \dfrac{-El - \frac{1}{2}\alpha\cdot(|Y| - Y_L)^2 - \frac{1}{2}\alpha'\cdot(|Y| - Y_M)^2 - V^2\cdot fo}{1 + \frac{1}{4}(Y/fo)^2 + V\cdot\alpha_1\cdot(Y/fo) + V^2}} + \frac{1}{4}y^2/fo + \frac{1}{2}\alpha(|Y| - Y_L)^2 + \frac{1}{2}\alpha'(|Y| - Y_M)^2$$

where $V=(\alpha+\alpha')|Y|-Y_L-\alpha' Y_M$.

7. A headlight according to claim 6, in which the cut-off is constituted by two horizontal half-planes at the same level, and corresponding to the beam from a fog-light, wherein the filament is disposed parallel to the optical axis and above the optical axis in such a manner that its light-emitting surface is substantially tangential to said optical axis, and wherein the surface of the reflector is defined by the equation of claim 6, and wherein the term $Y=y.\cos l+z.\sin l$ and $Z=-y.\sin l+z.\cos l$.

8. A headlight according to claim 1 further including a direct light mask disposed in front of the lamp, and wherein the distance between the center of the reflector and the beginnings of the intermediate zones is selected to be large enough to prevent the rays that are deflected inwards by the intermediate zones being intercepted by said mask.

* * * * *